United States Patent
Huang et al.

(10) Patent No.: US 11,217,810 B2
(45) Date of Patent: Jan. 4, 2022

(54) PREPARATION METHODS OF DIRECT ETHANOL FUEL CELLS

(71) Applicant: HARBIN INSTITUTE OF TECHNOLOGY, SHENZHEN, Shenzhen (CN)

(72) Inventors: Yan Huang, Shenzhen (CN); Jiaqi Wang, Shenzhen (CN)

(73) Assignee: HARBIN INSTITUTE OF TECHNOLOGY, SHENZHEN, Shenzhen (CN)

(*) Notice: Subject to any disclaimer, the term of this patent is extended or adjusted under 35 U.S.C. 154(b) by 96 days.

(21) Appl. No.: 16/691,635

(22) Filed: Nov. 22, 2019

(65) Prior Publication Data

US 2020/0106117 A1    Apr. 2, 2020

Related U.S. Application Data

(63) Continuation of application No. PCT/CN2018/109221, filed on Sep. 30, 2018.

(51) Int. Cl.
*H01M 8/16* (2006.01)
*H01M 8/0612* (2016.01)
*H01M 8/1011* (2016.01)

(52) U.S. Cl.
CPC ........... *H01M 8/16* (2013.01); *H01M 8/0631* (2013.01); *H01M 8/1011* (2013.01)

(58) Field of Classification Search
CPC .... H01M 8/16; H01M 8/0631; H01M 8/0625; H01M 8/0606; H01M 8/1011; H01M 8/1009; H01M 8/1013
See application file for complete search history.

(56) References Cited

U.S. PATENT DOCUMENTS

| | | | |
|---|---|---|---|
| 2005/0271915 A1* | 12/2005 | Haile | H01M 8/0637 429/424 |
| 2009/0069175 A1* | 3/2009 | Switzer | H01M 4/921 502/339 |
| 2011/0217623 A1* | 9/2011 | Jiang | H01M 8/1016 429/495 |

\* cited by examiner

*Primary Examiner* — Raymond Alejandro (57) ABSTRACT

A preparation method of a direct ethanol fuel cell includes synthesizing electrolytes, preparing a cathode and an anode, and clamping the electrolytes between the cathode and the anode to get direct ethanol fuel cell. The electrolytes are synthesized by polymerizing sodium acrylate with an initiator to get a hydrogel, and the hydrogel is soaked in a harsh alkaline solution. The cathode is synthesized by coating N,S codoped carbon catalyst onto a current collector, where the N,S codoped carbon catalyst is synthesized by mixing and preheating silica powder, sucrose and trithiocyanuric acid to get a mixed powder, and mixing and heating the mixed powder with poly tetra fluoroethylene so as to get the N,S codoped carbon catalyst. The anode is synthesized by coating Pt-Ru/C catalyst onto a current collector.

8 Claims, 13 Drawing Sheets

PREPARATION METHODS OF DIRECT ETHANOL FUEL CELLS

TECHNICAL FIELD

The present invention relates to the field of battery, in particular, to a direct ethanol fuel cell and a preparation method thereof.

BACKGROUND

A fuel cell is an energy transformation device which directly transforms the chemical energy into electrical energy. The essence of the fuel cell is an oxidation-reduction reaction (ORR). A fuel cell is mainly composed of anode, cathode, electrolyte and current collector. The anode and the cathode play the roles of both electrons conduction and catalysts for the ORR. The electrolyte includes acidic electrolyte and alkaline electrolyte, wherein some evidences reveal that the oxidation rate of ethanol in alkaline environment is much faster than that in acidic environment. Depending on the type of the fuel, the fuel cell includes hydrogen fuel cell, methane fuel cell, methanol fuel cell and ethanol fuel cell, wherein the methanol fuel cell is very popular and has a wide application for the excellent characteristics such as portability, non-toxicity, low-cost and easy to store.

However, there are still no flexible direct ethanol fuel cells (DEFC) that can be put into practical application so far, on one hand, in that the known catalysts are easy to be poisoned and thus inactivated by the intermediates CO produced during the catalytic oxidation of ethanol, on the other hand, in that the known electrolytes are easy to fail in a harsh alkaline environment.

SUMMARY

One subject of the invention is to provide a flexible direct ethanol fuel cell that can be put into practical application. Another object of the invention is to provide a preparation method of said direct ethanol fuel cell.

In one aspect of the invention, a preparation method of a direct ethanol fuel cell is provided, which comprises the steps of: synthesizing catalyst: mixing and preheating silica powder, sucrose and trithiocyanuric acid to get a mixed powder; mixing and heating the mixed powder with Teflon to get N,S codoped carbon catalyst; synthesizing electrolyte: polymerizing sodium acrylate with an initiator and soaking the resulted hydrogel in a harsh alkaline solution; preparing cathode: coating the N,S codoped carbon catalyst onto a current collector to get the cathode; preparing anode: coating Pt—Ru/C catalyst onto a current collector to get the anode; preparing the cell: clamping the soaked hydrogel between the cathode and the anode to get the cell.

In some embodiments, first dispersing equal weight of the silica powder, sucrose and trithiocyanuric add into deionized water, adding concentrated sulfuric acid therein, and then stirring fully and sonicating to get a mixed solution which is then proceeded the preheating step, wherein the weight of the concentrated sulfuric acid is 3%-5% of total weight of the silica powder, sucrose and trithiocyanuric acid.

In some embodiments, the preheating step includes first heating the mixed solution to 100° C. for liquid evaporation until it turns into solid, and then heating the resulted solid to 160° C. to get said mixed powder.

In some embodiments, the step of heating the mixed powder with Teflon comprising calcinating at 500-600° C. for 1-1.5 h and further calcinating at 1000-1100° C. for 3-3.5 h under inert atmosphere with a ramp rate of 5-8° C./min, wherein a ratio of weight of the Teflon to weight of the silica powder is no less than 10, and the Teflon is in powder form.

In some embodiments, synthesizing the sodium acrylate comprising steps of: fully stirring acrylic acid monomers and deionized water with weight ratio of 8:9-10 in an ice bath to get acrylic acid solution; fully mixing sodium hydroxide with deionized water with weight ratio of 1.5:1-1.2 to get sodium hydroxide solution; slowly adding the sodium hydroxide solution into the acrylic acid solution to obtain the sodium acrylate after full neutralization, wherein a ratio of weight of the acrylic acid monomers to weight of the sodium hydroxide is 2:1-1.5.

In some embodiments, the polymerizing step proceeds at 40±3° C. for 30-32 h to get the hydrogel which is dried at 100° C. for 1 h and then soaked in the harsh alkaline solution, wherein the harsh alkaline solution is 3-5 mol/L KOH solution.

In some embodiments, the step of preparing cathode comprising: mixing Nafion solution, isopropanol and deionized water with weight ratio of 1:1.8-2:7-7.2 to get a mixed solution; dispersing the N,S co-doped carbon catalyst into the mixed solution to get a first ink; coating the first ink onto the current collector to get the cathode.

In some embodiments, the step of preparing anode comprising: dispersing the Pt—Ru/C catalyst into the mixed solution to get a second ink; coating the second ink onto the current collector to get the anode; wherein, a ratio of weight of the Pt—Ru/C catalyst in the second ink to weight of the N,S co-doped carbon catalyst in the first ink is 1:2.

In another aspect of the invention, a direct ethanol fuel cell is provided which comprises a cathode, an anode and an electrolyte, with the electrolyte clamped between the cathode and the anode, wherein, the cathode is made by coating N,S codoped carbon catalyst on a current collector, the anode is made by coating Pt—Ru/C catalyst on a current collector, and the electrolyte is sodium polyacrylate hydrogel electrolyte.

In some embodiments, the current collector is a carbon cloth covered with sponge.

The direct ethanol fuel cell of the invention provides a number of benefits. First, the cathode is made from N,S codoped carbon catalyst which would not be poisoned and thus inactivated by intermediates such as CO produced during the catalytic oxidation of ethanol, and is of high catalytic activity and cost effective. Furthermore, the resulted N,S codoped carbon catalyst can be used to prepare cathode directly, without any post processing and thus simplifying the process of fabricating cell. Second, the sodium polyacrylate hydrogel electrolyte membrane which plays the role of electrolyte possesses superior and stable ionic conductivity in high concentration alkaline corrosive media due to its super-absorbing and water-retaining capabilities, thus avoiding the failure of known electrolyte in a harsh alkaline solution. Third, the cell made from the N,S codoped carbon catalyst, Pt—Ru/C catalyst, and alkaline sodium polyacrylate hydrogel electrolyte possesses remarkable flexibility, high energy density and can power an electronic clock or a smart phone once being dropped with ethanol.

BRIEF DESCRIPTION OF THE DRAWINGS

The further features of the invention will be apparent from the description of the preferred embodiments which are provided by way of example and with reference to the accompanying drawings, in which.

DESCRIPTION OF THE EMBODIMENTS

In order to make the objects and the advantages of the invention be apparent, the invention is further illustrated in detail by way of embodiments and accompanying figures. It should be noted that the specific embodiments described here are merely for explaining the invention rather than limiting the invention.

The first embodiment provides a direct ethanol fuel cell and a preparation method thereof.

The direct ethanol fuel cell includes a cathode, an anode and an electrolyte, wherein the electrolyte is clamped between the cathode and the anode. The cathode is made by coating N,S codoped carbon catalyst on a current collector. The anode is made by coating Pt—Ru/C catalyst on a current collector. The electrolyte is sodium polyacrylate hydrogel electrolyte.

Figure 1:
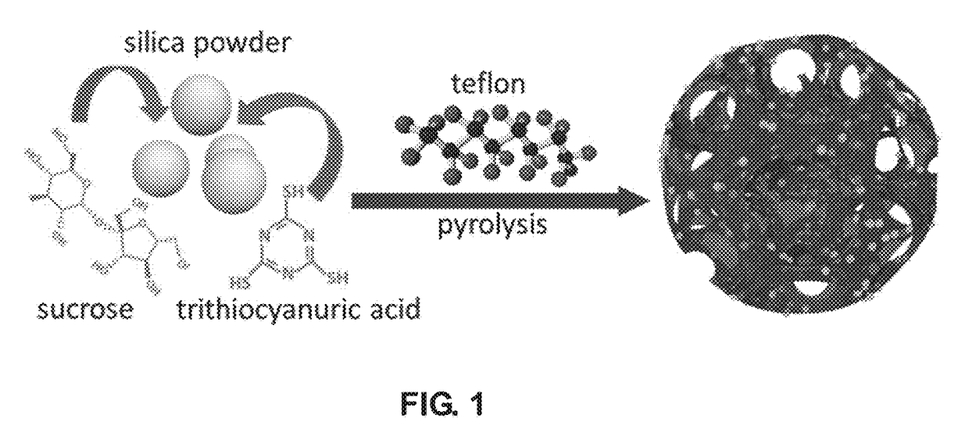
FIG. 1 is an illustration of synthesizing N,S codoped carbon catalyst.

The preparation method of the direct ethanol fuel cell in the embodiment includes the following steps:

Step 1 of synthesizing N,S codoped carbon catalyst using an in-situ etching method:

FIG. 1 is an illustration of synthesizing N,S codoped carbon catalyst. First of all, mixing and preheating silica powder, sucrose and trithiocyanuric acid to get a mixed powder. Then, mixing and heating the mixed powder with Teflon to get N,S codoped carbon catalyst. In this embodiment, the weights of the silica powder, sucrose and trithiocyanuric acid are the same. The silica powder is preferable fumed silica with particle size 200 nm. Preferably, the silica powder, sucrose and trithiocyanuric acid are first dispersed into deionized water, followed by addition of 96-97 wt. % $H_2SO_4$ and full mixture, wherein the weight of the $H_2SO_4$ is 3% of the total weight of the silica powder, sucrose and trithiocyanuric acid, and then sonicating for about 10 min to get a mixed solution. The mixed solution is preheated to get said mixed powder. In this embodiment, the preheated step includes the following sub-steps: the mixed solution is first heated up to 100° C. for liquid evaporation until it turns into solid, the resulted solid is then further heated at 160° C. for the polymerization of the sucrose and cross-linking of the trithiocyanuric acid monomers to get said mixed powder. In this embodiment, the obtained mixed powder is first finely ground and and uniformly mixed with an excess amount of Teflon powder to get a mixture which is then subject to be calcinated at 600° C. for 1 h and further at 1100° C. for 3 h under inert atmosphere with a ramp rate of 5° C./min so as to get the N,S codoped carbon catalyst powder. Preferably, the particle size of the Teflon is 5 um, and the ratio of the weight of the Teflon to the weight of the fumed silica powder is no less than 10.

It should be noted that, during the pyrolysis of synthesizing N,S codoped carbon catalyst by heating the mixture of the mixed powder and Teflon, the silica powder is etched away directly by HF which is formed through the chemical action between the tetrafluoroethylene (from Teflon) and water (from sucrose). In other words, the silica is corroded into $SiF_4$ by HF, and the $SiF_4$ evaporates into the air, thus avoiding any post processing and simplifying the process of fabricating cell. In addition, the preparation method is cost effective for preparing N,S codoped carbon catalyst.

Figure 2A:
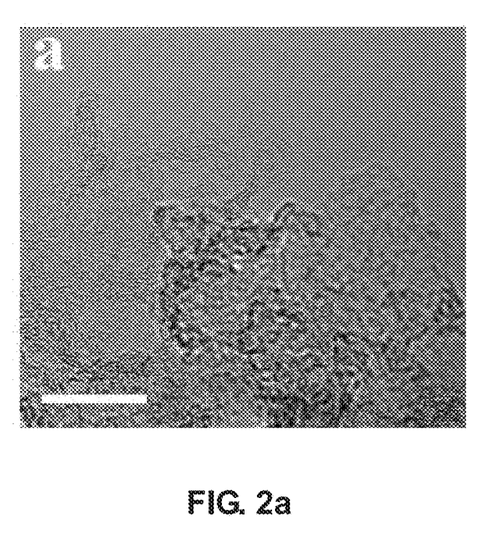
FIG. 2a is a TEM image of the N,S codoped carbon catalyst.
Figure 2B:
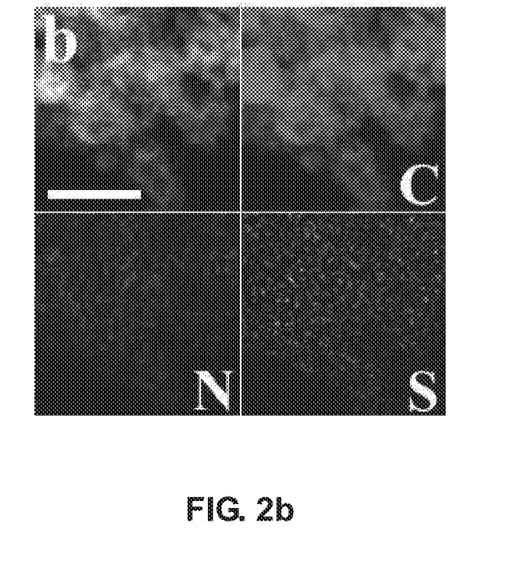
FIG. 2b is an electron energy loss spectroscopy (EELS) mapping of doped elements within the N,S codoped carbon catalyst.

FIG. 2a is a TEM image of the resulted N,S codoped carbon catalyst, with a scale of 10 nm. FIG. 2b is an electron energy loss spectroscopy (EELS) mapping of doped elements within the resulted N,S codoped carbon catalyst, with a scale of 1 um. As shown in FIG. 2a, hierarchical porosity is easily observed throughout the whole framework of the heteroatom doped amorphous carbon. As shown in FIG. 2b, doped elements N and S are distributed uniformly in the porous carbon skeleton. It is obvious that the resulted N,S codoped carbon catalyst has a high activity in that the porous carbon and the uniformly distributed doped elements contribute much to the activity of the catalyst.

Figure 3A:
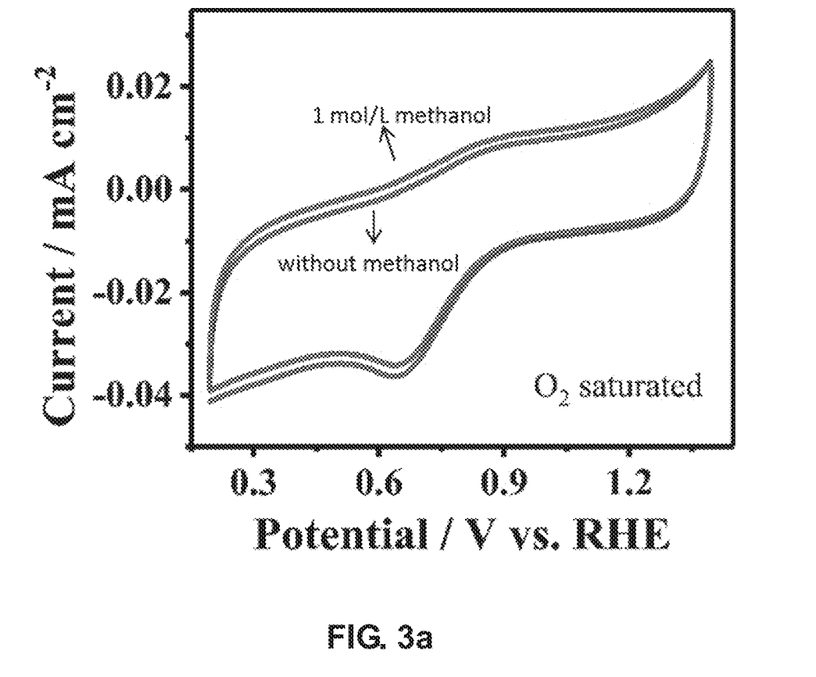
FIG. 3a shows respective polarization curves of the N,S codoped carbon catalyst in an environment with 1 mol/L, methanol and in an environment without methanol.
Figure 3B:
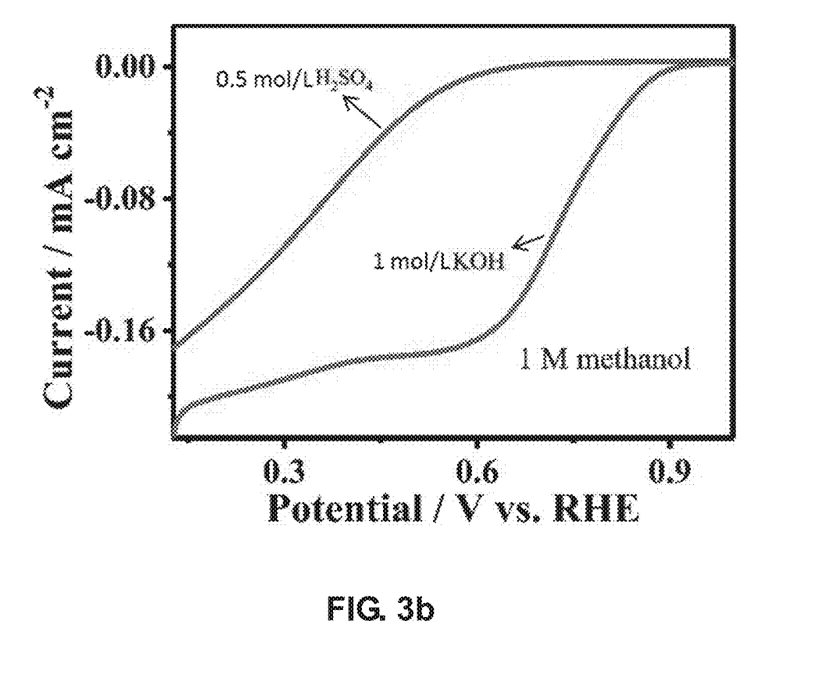
FIG. 3b shows respective polarization curves of the N,S codoped carbon catalyst in an acid environment and an alkali environment.
Figure 3C:
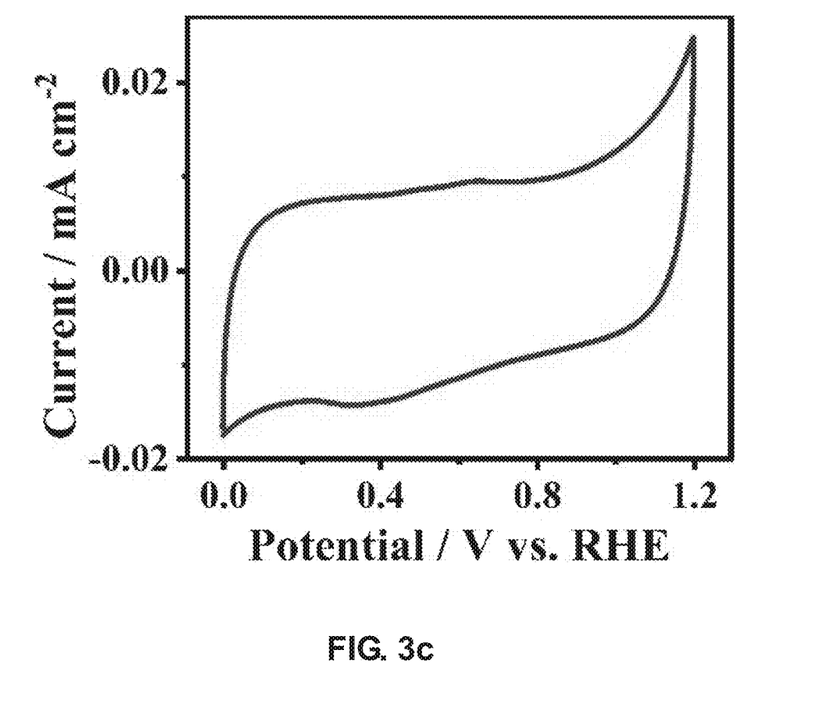
FIG. 3c shows a CV curve of the N,S codoped carbon catalyst.

FIG. 3a shows respective polarization curves of the resulted N,S codoped carbon catalyst in an environment with 1 mol/L methanol and in an environment without methanol, wherein the full name of RHE is reversible hydrogen electrode. As shown in the figure, the electrocatalytic performance of the resulted N,S co-doped carbon catalyst is not affected at all by the addition of methanol. The chemical property and the physical property of the methanol is similar to that of the ethanol, thus the resulted N,S co-doped carbon catalyst is not affected at all by the ethanol, either, which verifies that the resulted N,S codoped carbon catalyst would not be poisoned and thus inactivated by intermediates such as CO produced during the catalytic oxidation of ethanol. FIG. 3b shows respective polarization curves of the resulted N,S codoped carbon catalyst in an acid environment and an alkali environment. FIG. 3c shows a CV curve of the resulted N,S codoped carbon catalyst. As shown in the figures, the N,S codoped carbon catalyst has a higher electrocatalytic activity in an alkali environment than in an acid environment.

Figure 4:
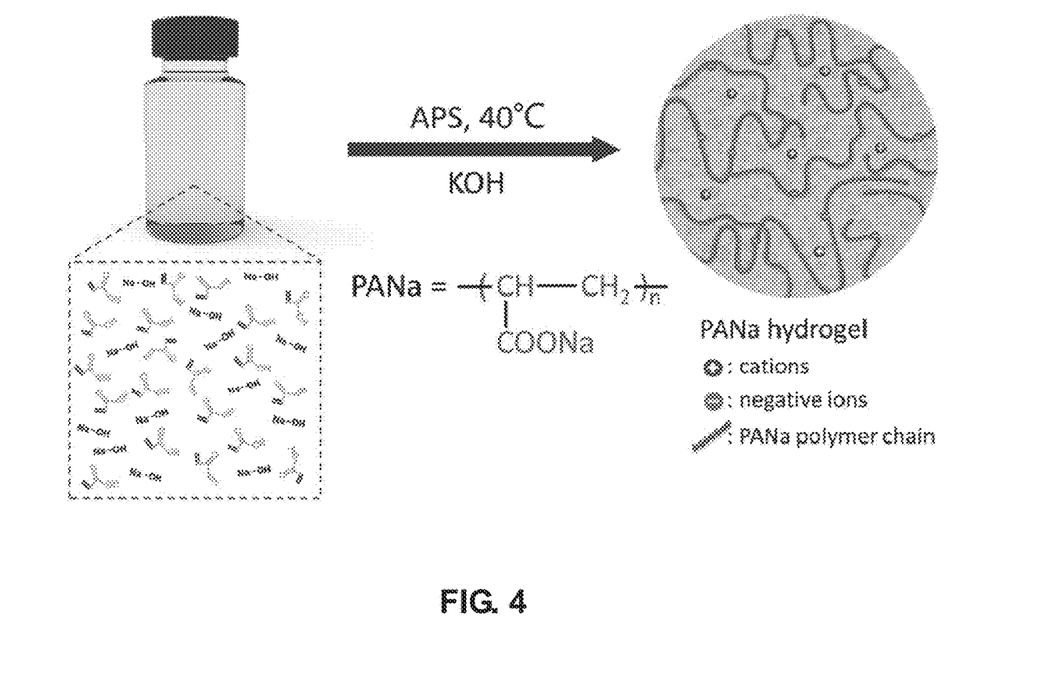
FIG. 4 is an illustration of synthesizing alkaline sodium polyacrylate hydrogel electrolyte.

Step 2 of synthesizing alkaline sodium polyacrylate hydrogel electrolyte:

FIG. 4 is an illustration of synthesizing alkaline sodium polyacrylate hydrogel electrolyte. The alkaline sodium polyacrylate (PANa) hydrogel electrolyte is synthesized by polymerizing sodium acrylate monomers with an initiator and soaking the resulted hydrogel in a harsh alkaline solution. The steps of synthesizing the sodium acrylate solution include: first, adding 48 g acrylic acid (AA) monomers into 54 g deionized water under plenitudinous stirring in an ice bath to get acrylic acid solution, fully mixing 26.7 g sodium hydroxide (NaOH) with 18 g deionized water to get sodium hydroxide solution; slowly adding the sodium hydroxide solution into the acrylic acid solution to obtain sodium acrylate solution after full neutralization. In this embodiment, the initiator is preferred ammonium persulfate (APS) with the weight of 0.78 g. The polymerization proceeds steadily in an oven at 40±3° C. for 30 h to get the PANa hydrogel which is dried in an oven at 100° C. for 1 h and then soaked in 5 mol/L KOH solution.

Figure 5:
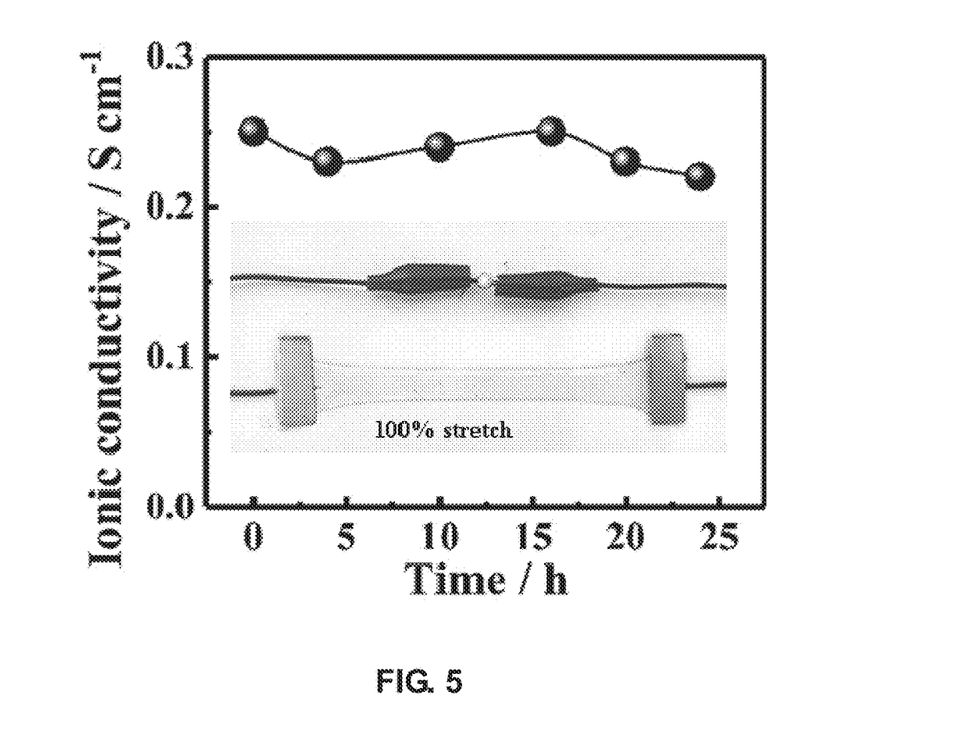
FIG. 5 shows the time-dependent change of ionic conductivity of sodium polyacrylate hydrogel electrolyte membrane under 100% stretch.

FIG. 5 shows the time-dependent change of ionic conductivity of sodium polyacrylate hydrogel electrolyte membrane under 100% stretch. As shown in the figure, the ionic conductivity of the sodium polyacrylate hydrogel electrolyte membrane keeps stable at 0.24 S/cm during the whole 25 h under the harsh condition of 100% stretch, which is two to three orders of magnitude higher than the ionic conductivity of most known polymer electrolytes. In particular, a LED bulb is successfully lighted by the sodium polyacrylate hydrogel electrolyte membrane. It can be concluded that the sodium polyacrylate hydrogel electrolyte membrane possesses remarkable flexibility, stability, and stable ionic conductivity for a long time. Furthermore, the sodium polyacrylate hydrogel electrolyte membrane possesses superior and stable ionic conductivity in high concentration alkaline corrosive media due to its super-absorbing and water-retaining capabilities, thus avoiding the failure of known electrolyte in a harsh alkaline solution.

Figure 6:
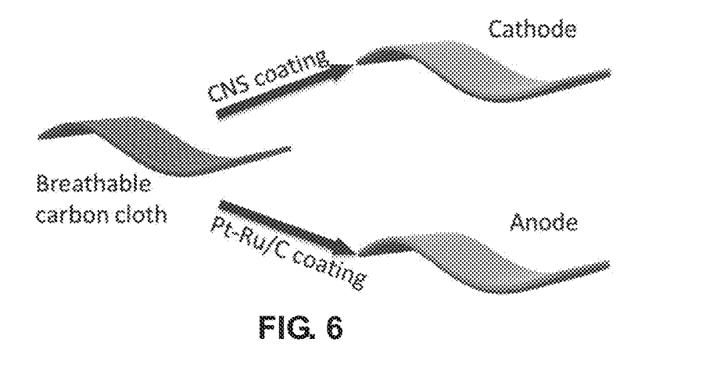
FIG. 6 respectively shows how to fabricate anode and cathode.
Figure 7A:
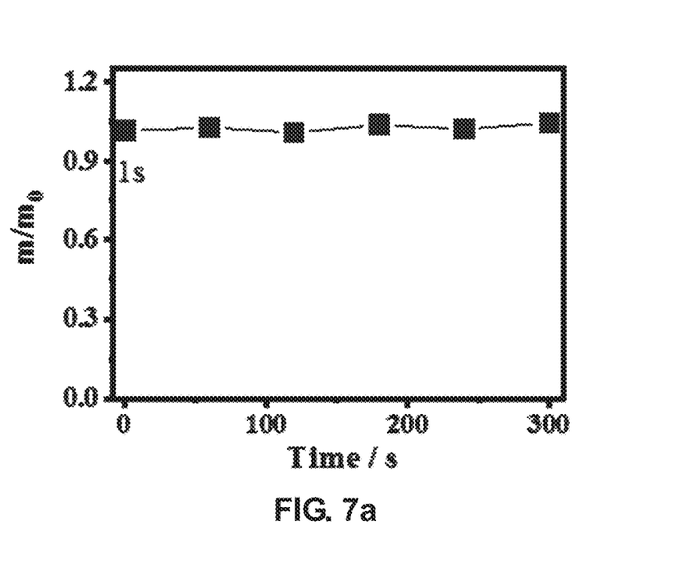
FIG. 7a illustrates the ability of the electrode made from carbon cloth to store ethanol.
Figure 7B:
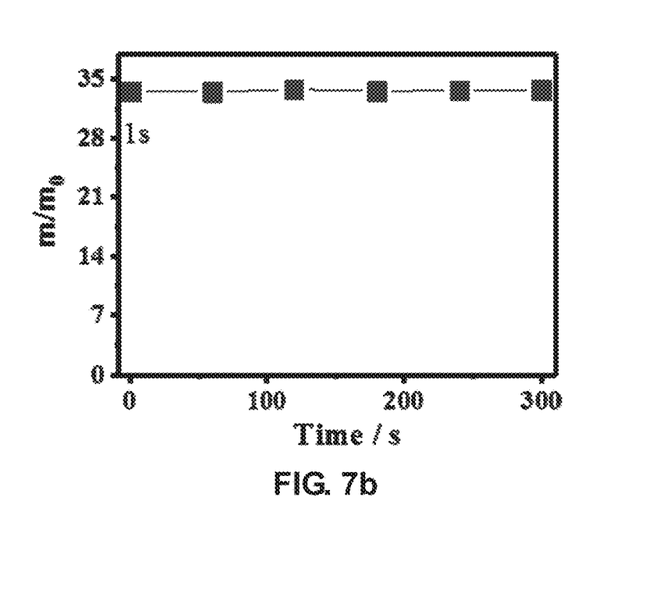
FIG. 7b illustrates the ability of the electrode made from sponge to store ethanol.

Step 3 of preparing cathode:

As shown in FIG. 6, the cathode is obtained by coating the N,S codoped carbon catalyst produced via the step 1 onto a current collector which is a preferred breathable carbon cloth. FIG. 7a illustrates the ability of the electrode made from carbon cloth to store ethanol. As seen from the figure, the carbon cloth can absorb ethanol as much as its own mass in a short time of 1 s, which is of much higher ability of absorbing ethanol than known current collectors such as CNT paper and metallic mesh/foam. In this embodiment, the method of preparing the cathode includes steps of: first, adding 0.1 g 5 wt. % Nafion solution into a mixed solution of deionized water (0.72 g) and isopropanol (0.18 g) to get a mixed solution; then, dispersing the N,S co-doped carbon catalyst (10 mg) into the mixed solution under preferable intensive ultrasonic for 15 min to get a first ink; at last coating the first ink onto the current collector to obtain the cathode, with catalyst loading of 2 mg/cm$^2$ and the coated area of 1 cm$^2$. Preferably, the current collector is a carbon cloth covered with a layer of sponge. FIG. 7b illustrates the ability of the electrode made from sponge to store ethanol. As shown in the figure, the sponge can absorb much more ethanol up to 33 times of its own mass during the same short time as the carbon cloth. Therefore, it can be concluded that the ability of absorbing ethanol of a current collector can be improved greatly by using a carbon cloth covered with a layer of sponge. Such good ability allows a flexible direct ethanol fuel cell to discharge over a long period of time.

Step 4 of preparing anode:

An anode is obtained by coating commercial Pt—Ru/C catalyst onto a current collector. Similar to the method of preparing cathode, in this embodiment, the method of preparing the anode: includes steps of: first, adding 0.1 g 5 wt. % Nafion solution into a mixed solution of deionized water (0.72 g) and isopropanol (0.18 g) to get a mixed solution; then, dispersing the Pt—Ru/C catalyst (5 mg) into the mixed solution under preferable intensive ultrasonic for 15 min to get a second ink; at last coating the second ink onto the current collector to obtain the anode, with catalyst loading of 1 mg/cm$^2$ and the coated area of 1 cm$^2$.

Figure 8A:
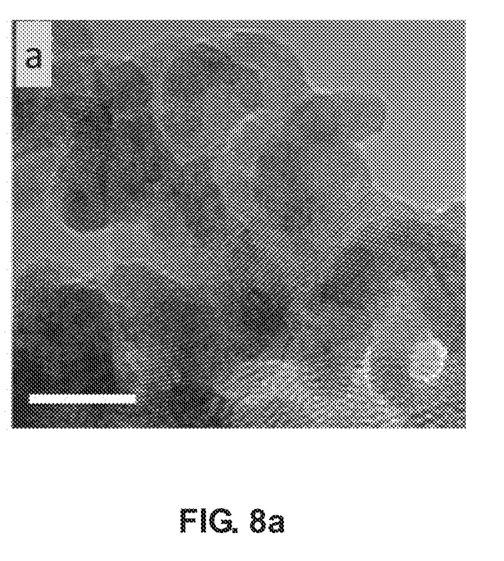
FIG. 8a is a TEM image of Pt—Ru/C catalyst.
Figure 8B:
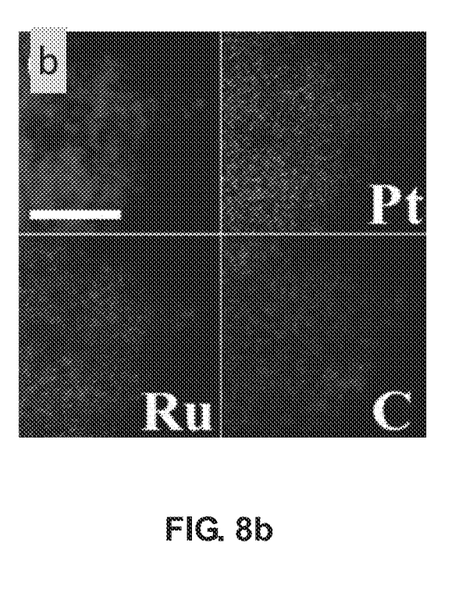
FIG. 8b is an electron energy loss spectroscopy (EELS) mapping of elements within the Pt—Ru/C catalyst.

FIG. 8a is a TEM image of Pt—Ru/C catalyst, with a scale of 5 nm, wherein the nanoparticles have diameters ranging from 3 nm to 7 nm. FIG. 8b is an electron energy loss spectroscopy (EELS) mapping of elements within the Pt—Ru/C catalyst, with a scale of 500 nm. As seen from the figure, the Pt and Ru elements are evenly distributed on carbon supports. Such distribution of the elements leads to high accessible active sites.

Figure 9A:
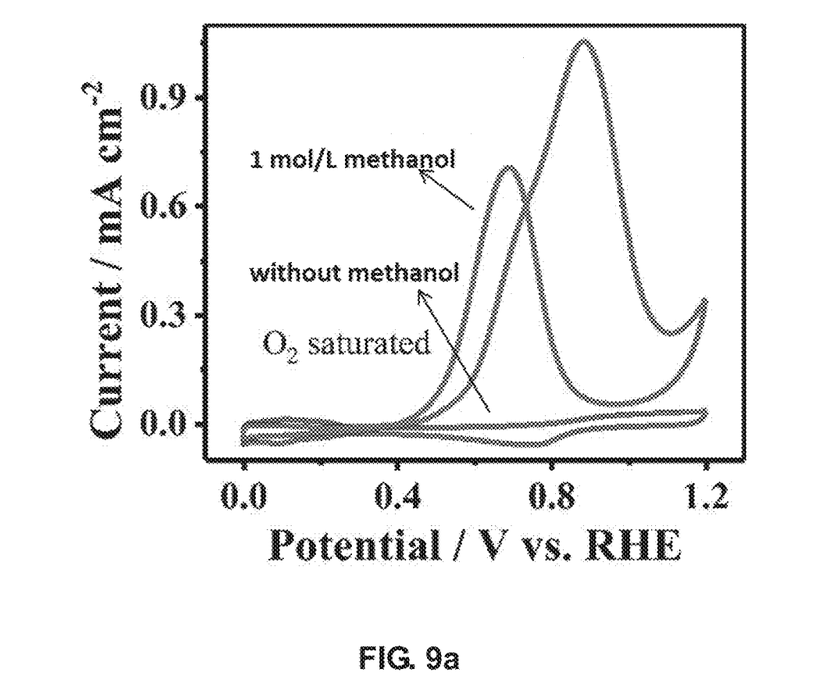
FIG. 9a shows respective polarization curves of the Pt—Ru/C catalyst in an environment with 1 mol/L methanol and in an environment without methanol.
Figure 9B:
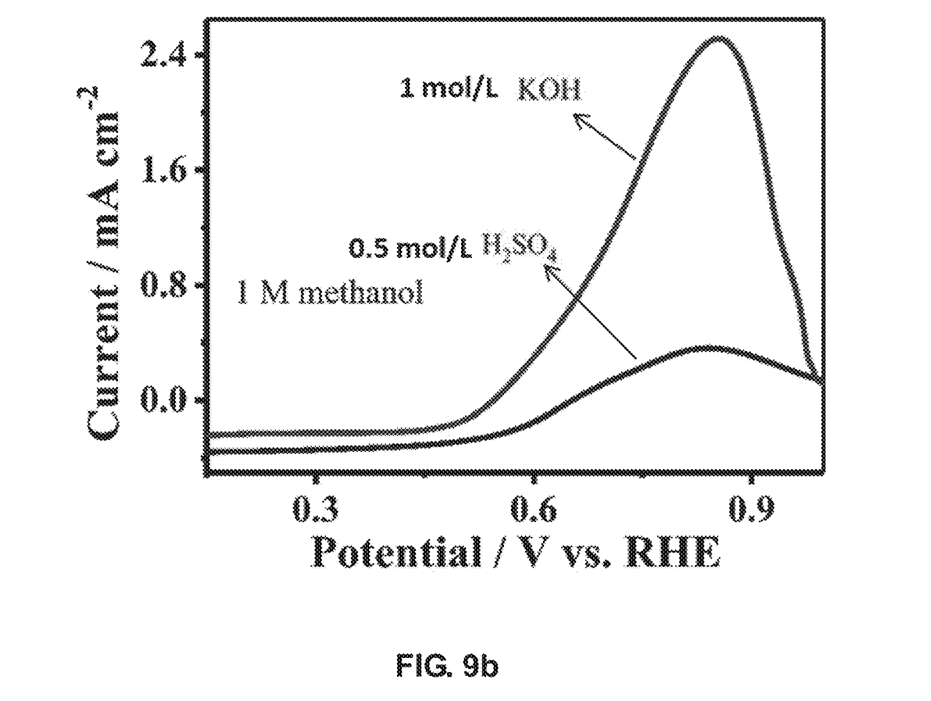
FIG. 9b shows respective polarization curves of the Pt—Ru/C catalyst in an acid environment and an alkali environment.
Figure 9C:
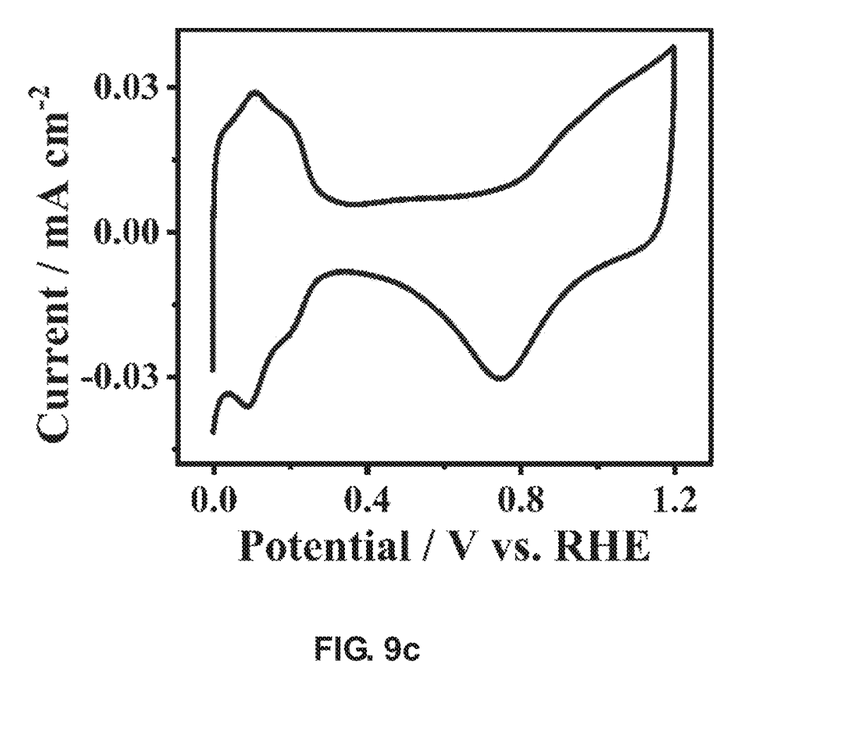
FIG. 9c shows a CV curve of the Pt—Ru/C catalyst.

FIG. 9a shows respective polarization curves of the Pt—Ru/C catalyst in an environment with 1 mol/L methanol and in an environment without methanol. As seen from the figure, the Pt—Ru/C catalyst has obvious oxidation performance of alcohols, so the oxidation to the ethanol can be retained by adopting the Pt—Ru/C catalyst as the anode of the cell. FIG. 9b shows respective polarization curves of the Pt—Ru/C, catalyst in an acid environment and an alkali environment. FIG. 9c shows a CV curve of the Pt—Ru/C catalyst. As seen from the figures, the Pt—Ru/C catalyst reveals higher oxidation performance in the alkali environment.

Figure 10A:
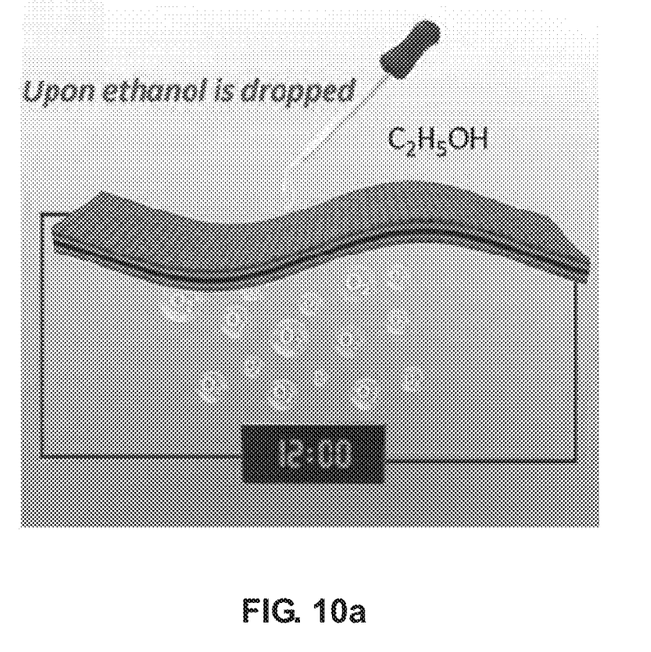
FIG. 10a is a demonstration of the flexible DEFC with the function of drop-and-play.
Figure 10B:
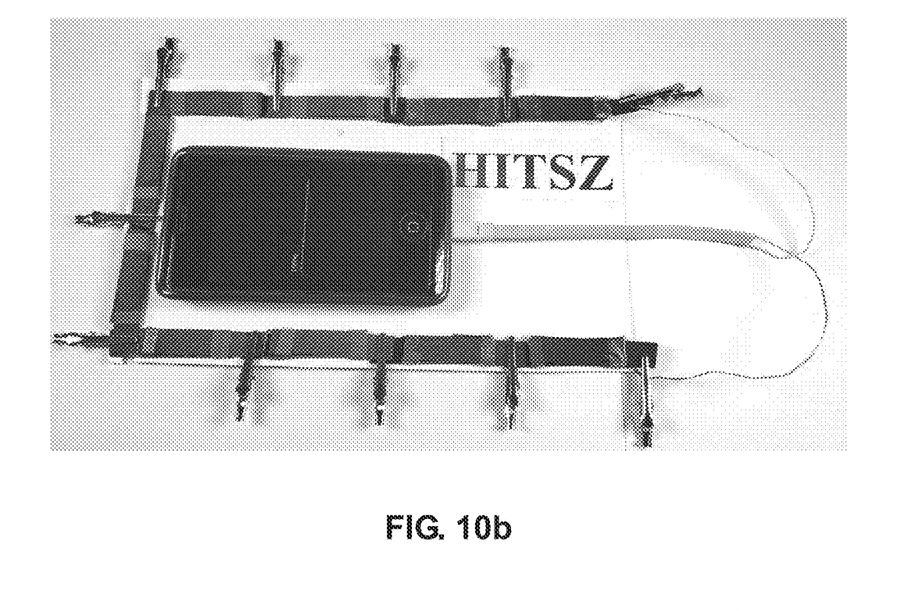
FIG. 10b is an illustration of the flexible DEFC powering a smart phone.

Step 5 of preparing cell:

The direct ethanol fuel cell is prepared by clamping the soaked hydrogel obtained via the step 2, i.e., alkaline sodium polyacrylate hydrogel electrolyte, between the cathode made via the step 3 and the anode made via the step 4, and then fixing the cathode, electrolyte and anode together with fine lines. FIG. 10a is a demonstration of the flexible DEFC with the function of drop-and-play, wherein the "drop-and-play" means that the cell can power an electronic clock or a smart phone by merely dropping ethanol on it. FIG. 10b is an illustration of the flexible DEFC powering a smart phone, which shows the possibility of flexible direct ethanol fuel cell to be commercialized for wide-scale and practical applications.

Figure 11A:
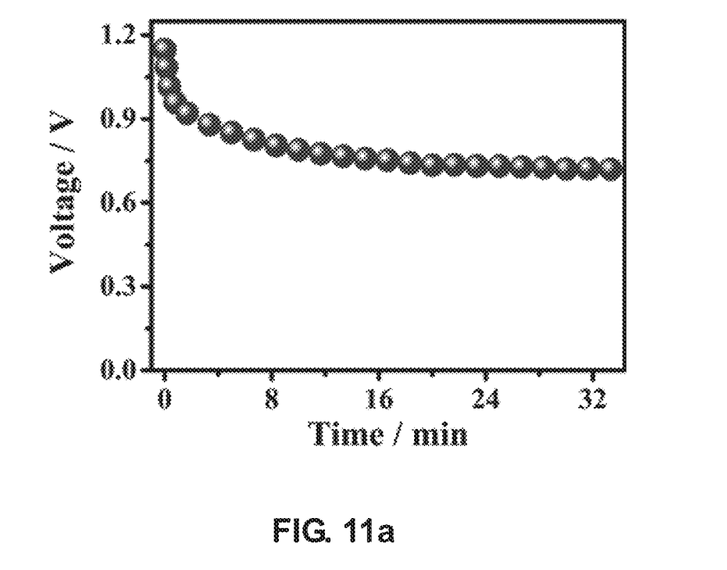
FIGS. 11a to 11e show the electrochemical test results of the flexible DEFC.
Figure 11B:
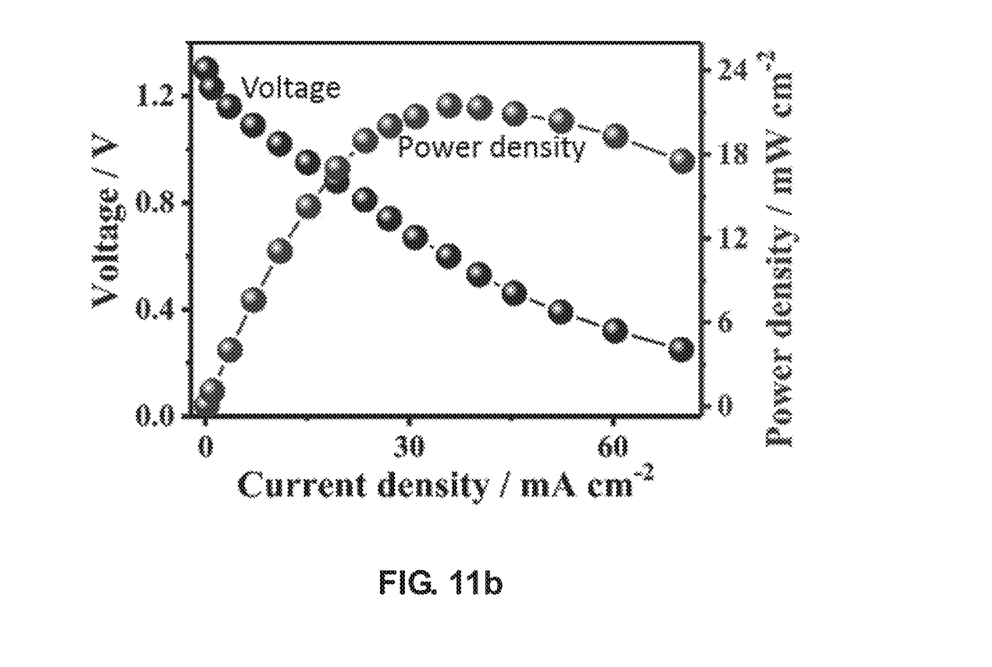
Figure 11C:
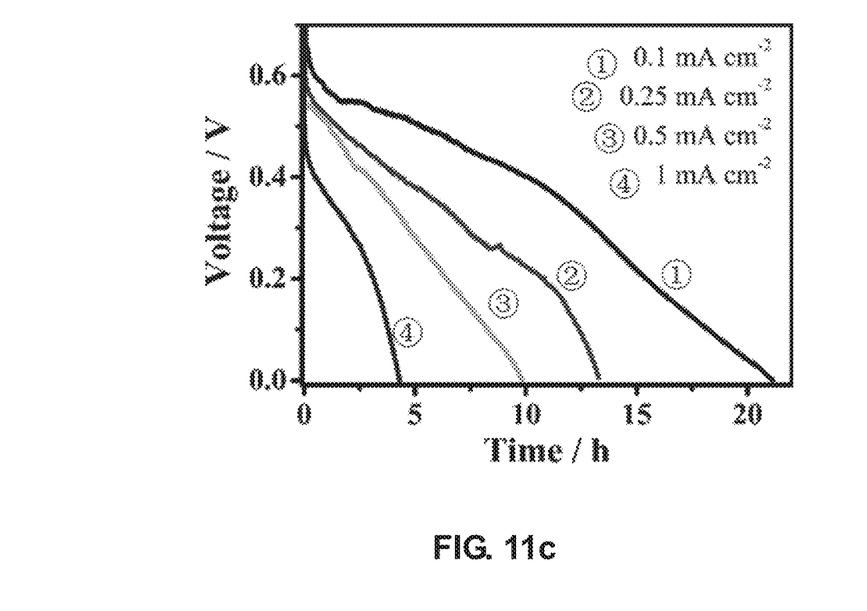
Figure 11D:
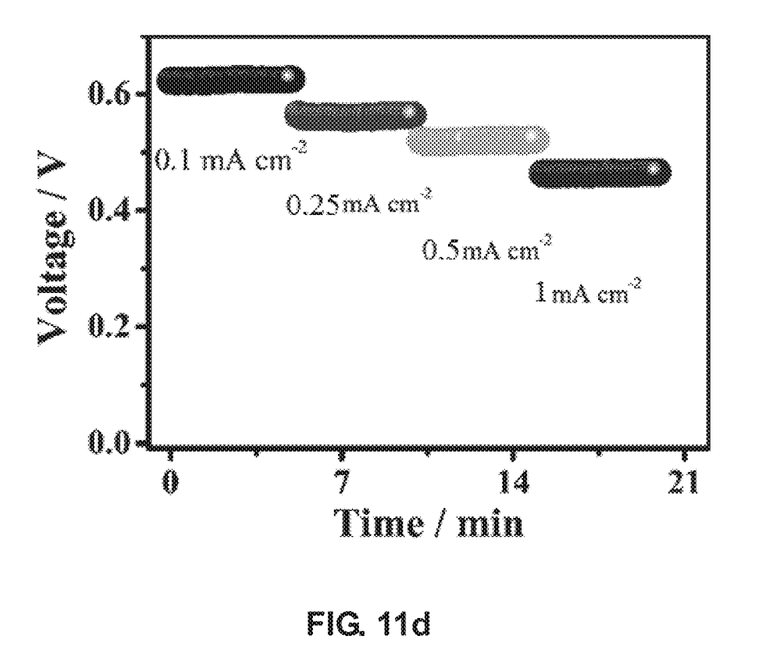
Figure 11E:
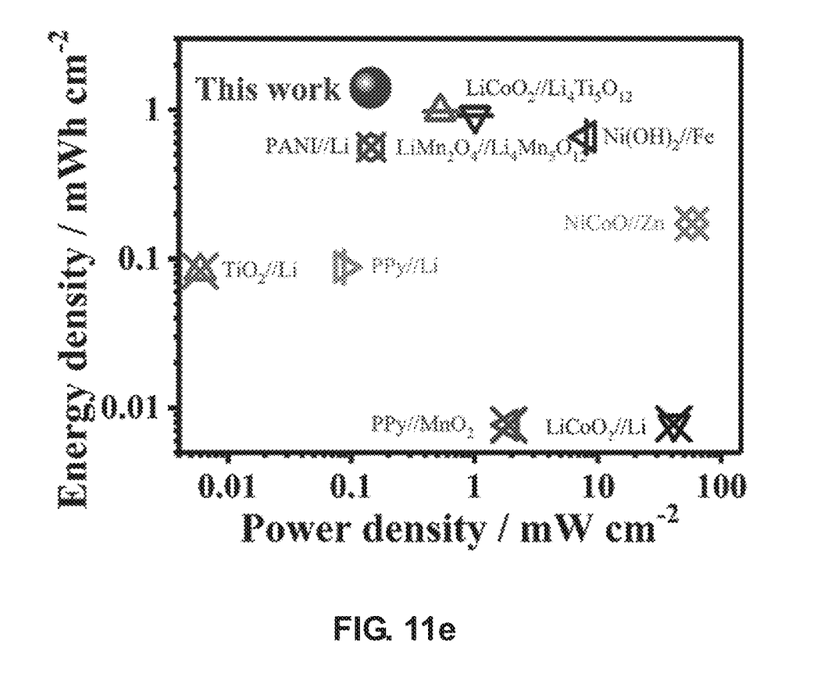

FIGS. 11a to 11e show the electrochemical test results of the flexible DEFC. FIG. 11a shows a OCCV curve, as seen from this figure, the DEFC achieves a maximum open circuit voltage (OCV) of 1.14 V and a stable OCV over 0.73V, which illustrates that the DEFC can be operated at high electrochemical kinetics. FIG. 11b shows a polarization curve and corresponding power densities calculated, as seen from this figure, the DEFC has a maximum output power density of 21.48 mW/cm$^2$ and can operate in a wide range of current density. FIG. 11c shows discharging profiles at various current densities from 0.1 mA/cm to 1 mA/cm$^2$, as seen from this figure, the DEFC discharges continuously for 21 h at a current density of 0.1 mA/cm$^2$ with merely 3 mL ethanol in total. Even at various higher current densities of 0.25 mA/cm$^2$, 0.5 mA/cm$^2$ and 1 mA/cm$^2$, it discharges for 13.3 h, 9.8 h and 4.3 h, respectively. FIG. 11d shows the rate performance at various current densities from 0.1 mA/cm to 1 mA/cm$^2$, as seen from this figure, the discharge voltage a=is high and stable when the current density is multiply increased. Such good rate performance reveals that the DEFC can be well used at a wide range of current. FIG. 11e shows the comparison between the DEFC of this embodiment and other known high-performance batteries, as seen from this figure, compared with other high-performance batteries such as PPy//MnO$_2$, LiCoO$_2$//Li, TiO$_2$//Li, LiCoO$_2$//Li$_4$Ti$_5$O$_{12}$, PANI//Li, LiMn$_2$O$_4$//Li$_4$Mn$_5$O$_{12}$, Ni(OH)$_2$//Fe, NiCoO//Zn and PPy//Li, the DEFC of this embodiment shows maximum areal energy density of 1.41 mWh/cm$^2$ at room temperature and atmospheric pressure.

Figure 12A:
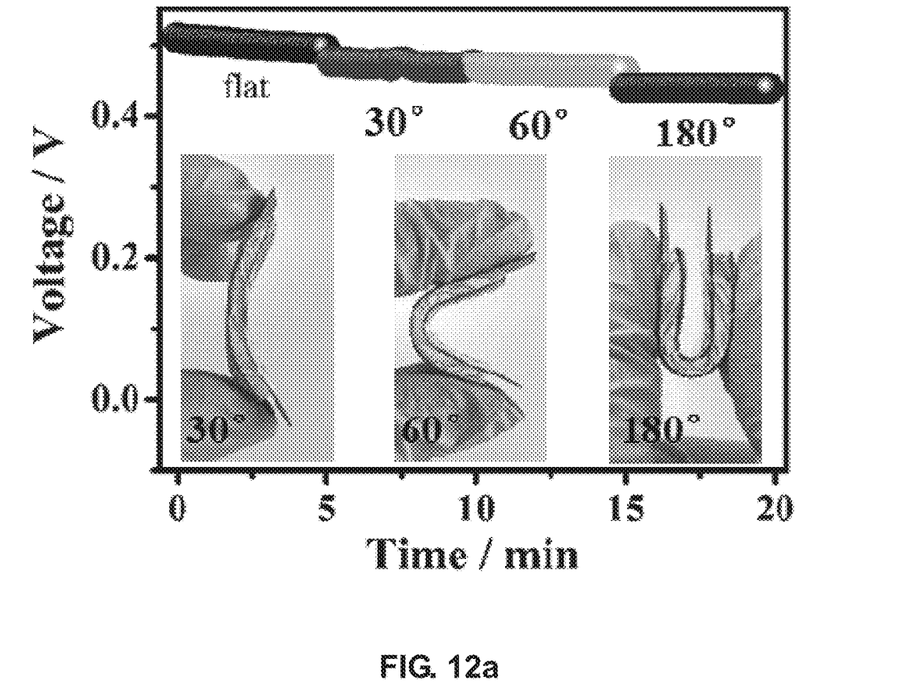
FIGS. 12a to 12d show the flexibility test results of the flexible DEFC.
Figure 12B:
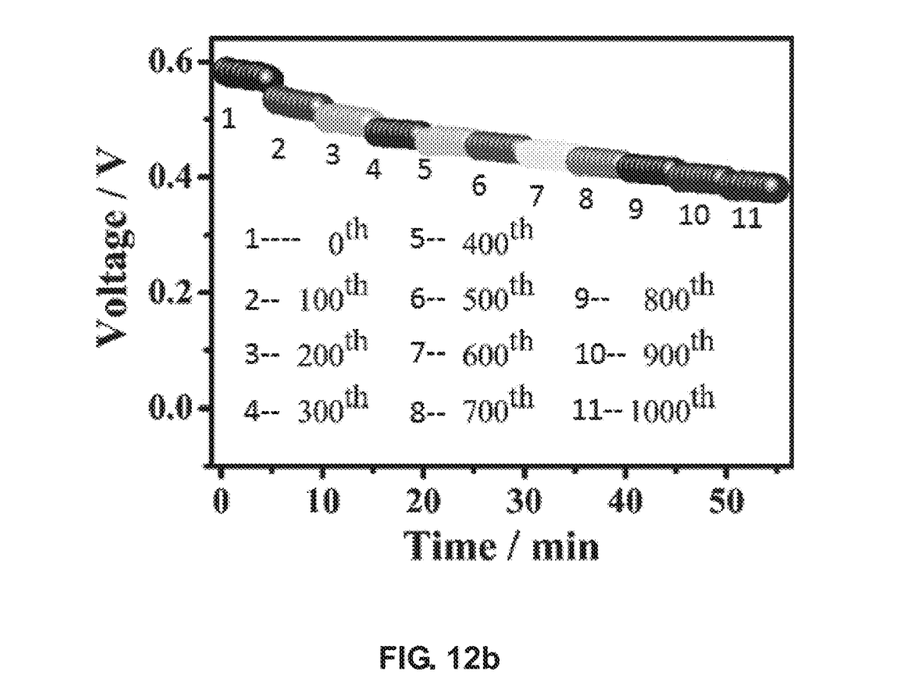
Figure 12C:
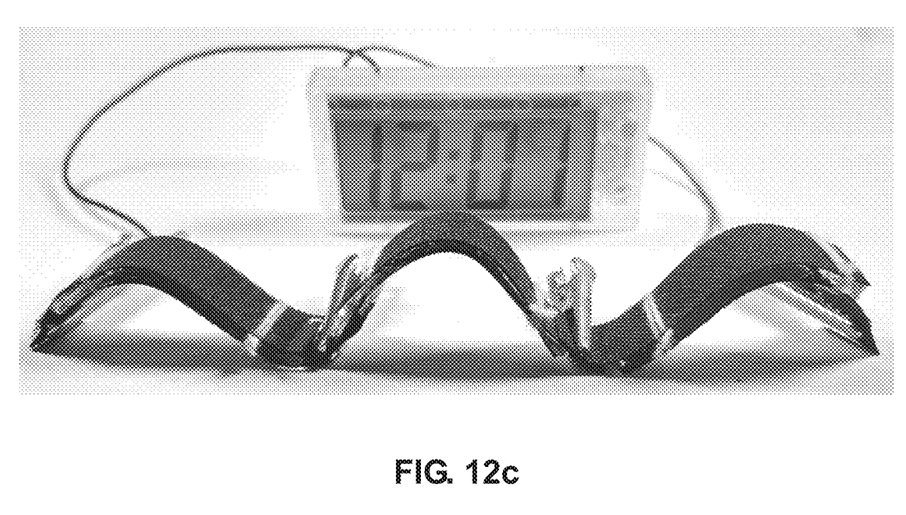
Figure 12D:
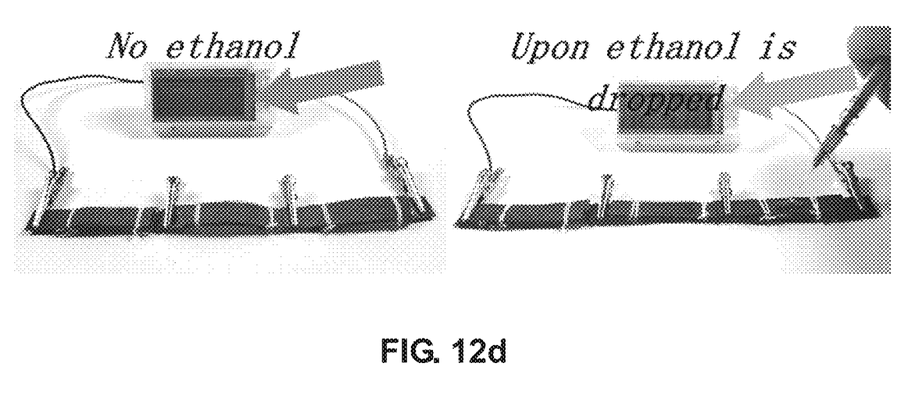

FIGS. 12a to 12d show the flexibility test results of the flexible DEFC. FIG. 12a shows discharge curves under consecutive bending from 0°, 30°, 60°, to 180°, as seen from this figure, the discharge voltage is merely reduced by 0.06V overall from 0° to 180°. FIG. 12b shows discharge curves undergoing various times of bending, as seen from this figure, the flexible DEFC reserves over 68% of the initial voltage even after being bent 1000 times. These results reveal that the resulted flexible DEFC possesses good flexibility. FIG. 12c shows flexible three-in-series DEFC powers an electronic clock, as seen from this figure, the electronic clock is powered all the time by severely bent DEFC in series. FIG. 12d is a demonstration of the drop-and-play function by three-in-series DEFC. In the condition without ethanol, the DEFC cannot power and thus the electronic clock does not work. However, once the DEFC is dropped with only a little ethanol, the DEFC is able to power and the electronic clock starts to work, with a function of drop-and-play for cell being achieved.

The same parts of the second embodiment with the first embodiment are omitted, and the differences between them in that:

In step 1, the weight of the 96-97 wt. % H$_2$SO$_4$ is 5% of the total weight of the silica powder, sucrose and trithiocyanuric acid; the preheated step includes heating the mixed solution up to 90° C. for liquid evaporation until it turns into solid, then further heating the resulted solid at 150° C. to get said mixed powder; the mixture of the mixed powder and Teflon powder is subject to be calcinated at 500° C. for 1.5 h and further at 1000° C. for 3.5 h with a ramp rate of 5° C./min.

In step 2, 48 g acrylic acid (AA) monomer is added into 60 g deionized water under plenitudinous stirring in an ice bath to get acrylic acid solution, and 27 g sodium hydroxide (NaOH) is fully mixed with 21 g deionized water to get sodium hydroxide solution. The polymerization proceeds for 32 h to get the PANa hydrogel which is dried in an oven at 100° C. for 1 h and then soaked in 3 mol/L KOH solution.

In step 3, 0.1 g 5 wt. % Nafion solution, 0.7 g deionized water, and 0.2 g isopropanol are mixed to get a mixed solution.

The above embodiments are merely the preferred embodiments of the invention, rather than limitations to the invention. Any modifications, equivalents, or developments made in the spirit and principle of the invention should be included in the scope of the invention.

What is claimed is:

1. A preparation method of a direct ethanol fuel cell, comprising steps of:
   (S1) synthesizing catalyst, comprising steps of:
      (S1.1) mixing silica powder, sucrose and trithiocyanuric acid,
      (S1.2) preheating the silica powder, the sucrose and the trithiocyanuric acid to get a mixed powder,
      (S1.3) mixing the mixed powder with poly tetra fluoroethylene, and
      (S1.4) heating the mixed powder with poly tetra fluoroethylene to get N,S codoped carbon catalyst;
   (S2) synthesizing electrolyte, comprising steps of:
      (S2.1) polymerizing sodium acrylate with an initiator to get a hydrogel, and
      (S2.2) soaking the hydrogel in a harsh alkaline solution;
   (S3) preparing a cathode, comprising steps of:
      coating the N,S codoped carbon catalyst obtained in step (S1) onto a current collector to get the cathode;
   (S4) preparing a anode, comprising steps of:
      coating Pt-Ru/C catalyst onto a current collector to get the anode; and
   (S5) preparing the direct ethanol fuel cell, comprising steps of:
      clamping the hydrogel soaked in the harsh alkaline solution obtained in step (S2) between the cathode obtained in step (S3) and the anode obtained in step (S4) to get the direct ethanol fuel cell.

2. The preparation method according to claim 1, wherein step (S1.1) comprises steps of:
   dispersing equal weight of the silica powder, the sucrose and the trithiocyanuric acid into deionized water,
   adding concentrated sulfuric acid therein, and then
   stirring fully and sonicating to get a mixed solution,
   wherein weight of the concentrated sulfuric acid is 3% to 5% of total weight of the silica powder, the sucrose and the trithiocyanuric acid.

3. The preparation method according to claim 2, wherein step (S1.2) comprises:
   heating the mixed solution to 90° C. to 100° C. for liquid evaporation until it turns into solid, and then
   heating the solid to 150° C. to 160° C. to get said mixed powder.

4. The preparation method according to claim 1, wherein step (S1.4) comprises:
   calcinating at 500 to 600° C. for 1 h to 1.5 h under inert atmosphere, and further
   calcinating at 1000 to 1100° C. for 3 h to 3.5 h under inert atmosphere with a ramp rate of 5° C./min to 8° C./min, wherein
   a ratio of weight of the poly tetra fluoroethylene to weight of the silica powder is no less than 10, and the poly tetra fluoroethylene is in powder form.

5. The preparation method according to claim 1, wherein the sodium acrylate is synthesized through steps of:
   fully stirring acrylic acid monomers and deionized water with weight ratio of 8:9 to 8:10 in an ice bath to get acrylic acid solution;
   fully mixing sodium hydroxide with deionized water with weight ratio of 1.5:1 to 1.5:1.2 to get sodium hydroxide solution; and
   slowly adding the sodium hydroxide solution into the acrylic acid solution to obtain the sodium acrylate after full neutralization, wherein a ratio of weight of the acrylic acid monomers to weight of the sodium hydroxide is 2:1 to 2:1.5.

6. The preparation method according to claim 5, wherein step (2.1) proceeds at 40±3° C. for 30 h to 32 h to get the hydrogel which is dried at 100° C. for 1 h and then soaked in the harsh alkaline solution, wherein the harsh alkaline solution is 3 mol/L to 5 mol/L KOH solution.

7. The preparation method according to claim 1, wherein step (S3) comprises:

mixing perfluorosulfonic acid polymer solution, isopropanol and deionized water with weight ratio of 1:1.8 to 2:7 to 7.2 to get a mixed solution;

dispersing the N,S codoped carbon catalyst into the mixed solution to get a first ink; and coating the first ink onto the current collector to get the cathode.

8. The preparation method according to claim 7, wherein step (S4) comprises:

dispersing the Pt-Ru/C catalyst into the mixed solution to get a second ink; and coating the second ink onto the current collector to get the anode; wherein, a ratio of weight of the Pt-Ru/C catalyst in the second ink to weight of the N,S codoped carbon catalyst in the first ink is 1:2.

* * * * *